(12) United States Patent
Altshuler et al.

(10) Patent No.: US 9,074,726 B2
(45) Date of Patent: Jul. 7, 2015

(54) LINEAR TRANSLATIONAL MICROSCOPE STAND

(75) Inventors: Edward Lafe Altshuler, Erie, CO (US); Benjamin James Titchenal, Boulder, CO (US); Kevin Dean Lambert, Johnstown, CO (US); Thomas William Wynne, Boulder, CO (US)

(73) Assignee: Edward Lafe Altshuler, Dacono, CO (US)

( * ) Notice: Subject to any disclaimer, the term of this patent is extended or adjusted under 35 U.S.C. 154(b) by 2324 days.

(21) Appl. No.: 11/796,501

(22) Filed: Apr. 27, 2007

(65) Prior Publication Data

US 2008/0265120 A1    Oct. 30, 2008

(51) Int. Cl.
| | |
|---|---|
| *F16M 13/00* | (2006.01) |
| *F16M 11/24* | (2006.01) |
| *G02B 21/00* | (2006.01) |
| *G02B 21/26* | (2006.01) |
| *F16M 11/04* | (2006.01) |
| *F16M 11/18* | (2006.01) |

(52) U.S. Cl.
CPC ........... *F16M 11/24* (2013.01); *G02B 21/0008* (2013.01); *G02B 21/26* (2013.01); *F16M 11/046* (2013.01); *F16M 11/18* (2013.01); *F16M 2200/08* (2013.01)

(58) Field of Classification Search
USPC .......... 248/127, 157, 405, 422; 359/383, 384, 359/368, 900; D16/130, 131
See application file for complete search history.

(56) References Cited

U.S. PATENT DOCUMENTS

| | | | | |
|---|---|---|---|---|
| 678,642 | A | * | 7/1901 | Chambers, .................... 351/245 |
| 2,004,807 | A | * | 6/1935 | Gustave ........................ 396/432 |
| 2,255,630 | A | * | 9/1941 | Sass .............................. 359/383 |
| 3,508,835 | A | * | 4/1970 | Ware ............................. 356/396 |
| 4,367,915 | A | * | 1/1983 | Georges ........................ 359/385 |
| 4,676,608 | A | * | 6/1987 | Faubion ........................ 359/383 |
| 4,729,646 | A | * | 3/1988 | Clark et al. ................... 359/383 |
| 5,818,637 | A | | 10/1998 | Hoover et al. |
| 6,400,395 | B1 | | 6/2002 | Hoover et al. |
| 7,253,947 | B2 | * | 8/2007 | Bromage et al. .............. 359/368 |
| 7,564,625 | B2 | * | 7/2009 | McLeod et al. ............... 359/393 |
| 2005/0111094 | A1 | | 5/2005 | Bonaventura et al. |

* cited by examiner

*Primary Examiner* — Monica Millner
(74) *Attorney, Agent, or Firm* — Kenneth Altshuler

(57) ABSTRACT

A microscope stand which can include a base, a driving mechanism, a hollow column, a translational element and a support element is described. The hollow column can have at least one elongated opening that extends between a first end and a second end of the column wherein the column is attached to the base at the first end. The translational element is disposed substantially inside of the hollow column and is adapted to cooperate with the support element via the at least one elongated opening, the support element is moveable by the translational element along the column in a direction between the first end to the second end.

1 Claim, 11 Drawing Sheets

LINEAR TRANSLATIONAL MICROSCOPE STAND

CROSS-REFERENCE TO RELATED APPLICATIONS

None

FIELD OF THE INVENTION

The present invention is directed to a linear translational stand that is useful in providing support to a microscope when moved along the linear translational stand.

BACKGROUND OF THE INVENTION

For many years, light based microscopes and their associated peripherals have been considered a mature technology. Consequently, there has been great market pressure to reduce costs and yet still provide some level of innovation. Microscope stands are one example in which innovation and manufacturing costs have been driven by such market pressures.

Generally, microscope stands today are architected to accommodate two basic microscope stand systems; namely stereo microscope stands and boom stands. Stereo microscope stands are considered to be closed architecture because they are more or less specifically tailored for a particular type of microscope. Boom stands, on the other hand, are adapted for universal microscope use, hence are considered open architecture. Both stereo microscope stands and boom stands rely on friction, typically by way of a support collar, to help assist in supporting a microscope as it is moved vertically along a microscope stand's shaft. In the case of a boom stand system, an operator may be required to lift a microscope along the microscope stand's shaft. In the case of a stereo microscope system, a rack and pinion configuration may be used for moving a stereo microscope along a stereo microscope stand's shaft. In either case, both systems are somewhat exposed to undesirable effects of back-drive, whereby the collar slides down the microscope stand shaft causing the associated microscope to go out of focus. Hence, springs, counter weights, friction based knobs, or a combination thereof are often employed at the collar. Consequently, microscope use can often be cumbersome due to so many functional devices at the collar.

In an effort to improve back-drive problems and ease of and ergonomics use, both methods and apparatuses are disclosed herein. It is to innovations related to this subject matter that the claimed invention is generally directed.

SUMMARY OF THE INVENTION

The present invention relates generally to a linear translational stand that is useful in providing support to a microscope when moved along the linear translational stand.

Embodiment of the present invention can therefore comprise a linear translational stand comprising: a base; a hollow column comprising at least one elongated opening that extends between a first end and a second end of the column wherein the column is attached to the base at the first end; a translational element that is substantially inside of the hollow column; and a support element cooperating with the translational element via the at least one elongated opening, the support element moveable by the translational element along the column in a direction from the first end to the second end and from the second end to the first end.

Another embodiment of the present invention can therefore comprise a method of operating a linear translational stand, the method comprising the step of: providing a hollow column having a first end and a second end wherein the column is attached to a base at the first end, the column further comprising at least one elongated opening that extends between the first and the second ends; operating a translational element substantially disposed inside of the hollow column wherein the translational element cooperates with a support element via the at least one elongated opening; and moving the support element via the operating translational element in a direction from the first end to the second end wherein the support element is at least partially outside of the column.

Yet another embodiment of the present invention can therefore comprise a microscope stand comprising: a base; a driving mechanism; a hollow column having at least one elongated opening that extends between a first end to a second end of the column wherein the column is attached to the base at the first end; a lead screw element that is substantially disposed in the hollow column, the lead screw element rotatable by the driving mechanism; a lead screw nut cooperating with the lead screw element; a support collar that is connected to the lead screw nut via at least one member that extends through the at least one elongated opening.

DETAILED DESCRIPTION

Figure 1A:
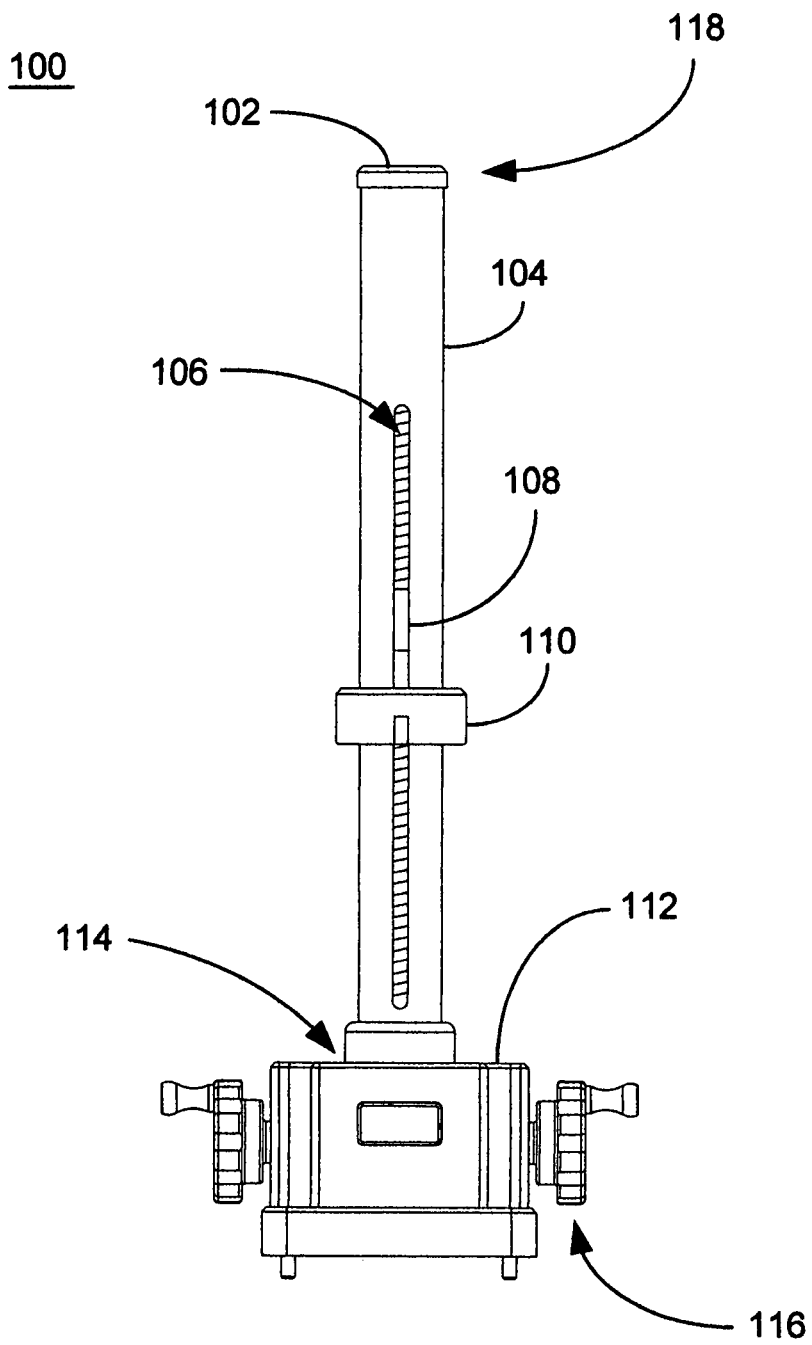
FIGS. 1A and 1B are illustrations of a linear translational stand arrangement constructed in accordance with an embodiment of the present invention.

Referring to the drawings in general, and more specifically to FIG. 1A, shown therein is an illustration of a linear translational stand arrangement constructed in accordance with an embodiment of the present invention. In what follows, similar or identical structures may be identified using identical callouts.

As shown in a commercial embodiment, by Old School Industries, Inc. of Dacono, Colo., the linear translational stand arrangement 100 illustrated in FIG. 1A, can generally comprise a base 112, a hollow column 104, a translational element 106 and a support element 110. The hollow column 104 can comprise at least one elongated opening 108 that extends between a first end 114 and a second end 118 of the column 104 wherein the column 104 is attached to the base 112 at the first end 114. As shown, the translational element 106, which can be seen through the elongated opening 108, is substantially inside of the hollow column 104. In this embodiment, the translational element 106 is a lead-screw as indicated by the threaded pitch (as shown). The translational element 106 moves the support element 110 (shown herein as a collar) along the column 104 in the direction from the first end 114 to the second end 118 or from the second end 118 to the first 114. The translational element 106 has a cooperating relationship with the support element 110 via at least the elongated opening 108. In one embodiment, the support element 110 comprises a linking member (not shown) that connects the support element 110 to a lead-screw nut (not shown) that, in turn, is driven up and down the lead-screw 106. The translational element 106 can be something other than a lead-screw that cooperates with the support element 110 as long as the support element 10 is moved up and down the hollow column 104. For example, the translational element 106 can be a belt system, a belt gear system, rack and pinion system, etc. As illustrated herein, the lead-screw 106 is rotated manually by at least one rotatable knob 116, which can be a spinner, speed knob, handle knob, hand crank or an alternative member that accomplishes the same function without departing from the spirit of this embodiment. Herein, rotatably or rotatable is directed to an object that is capable of being, or able to be, rotated.

Figure 1B:
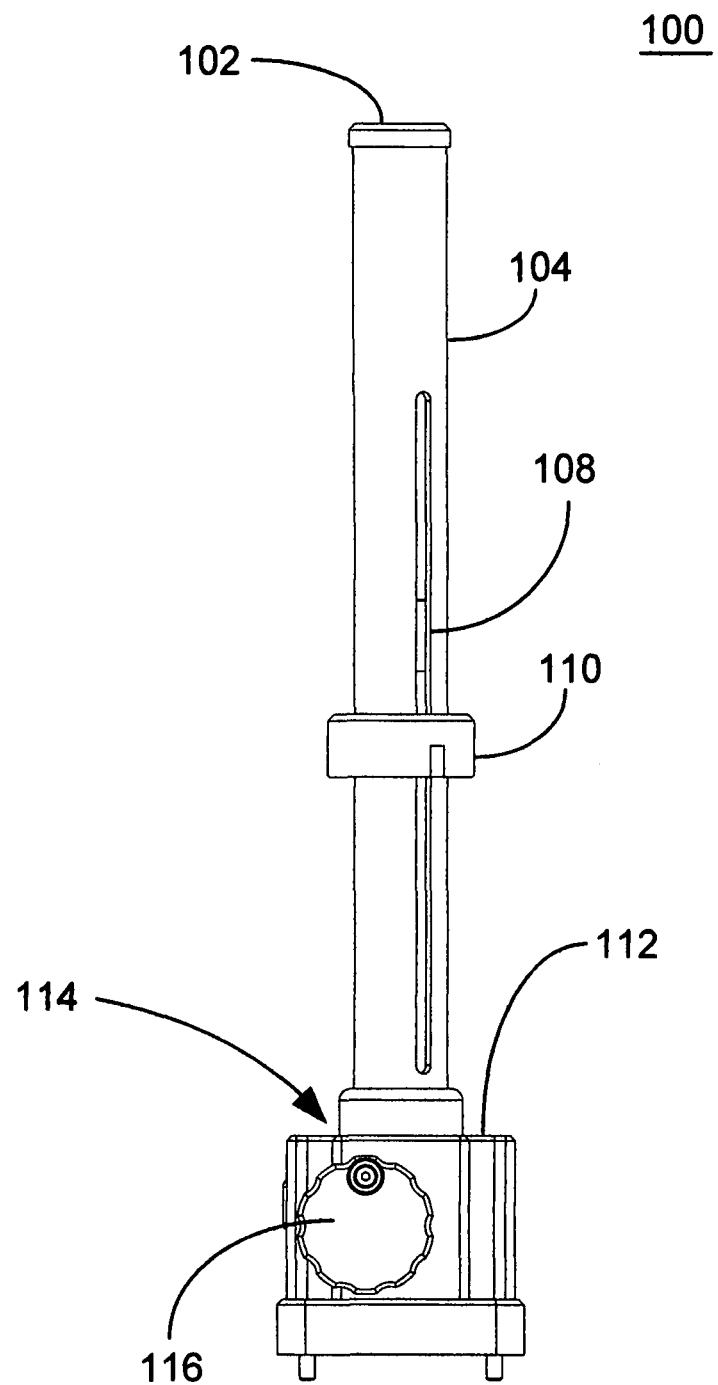

FIG. 1B is a side view illustration of the linear translational stand arrangement 100. The hollow column 104 is slightly turned to reveal the at least one elongated opening 108.

Figure 2:
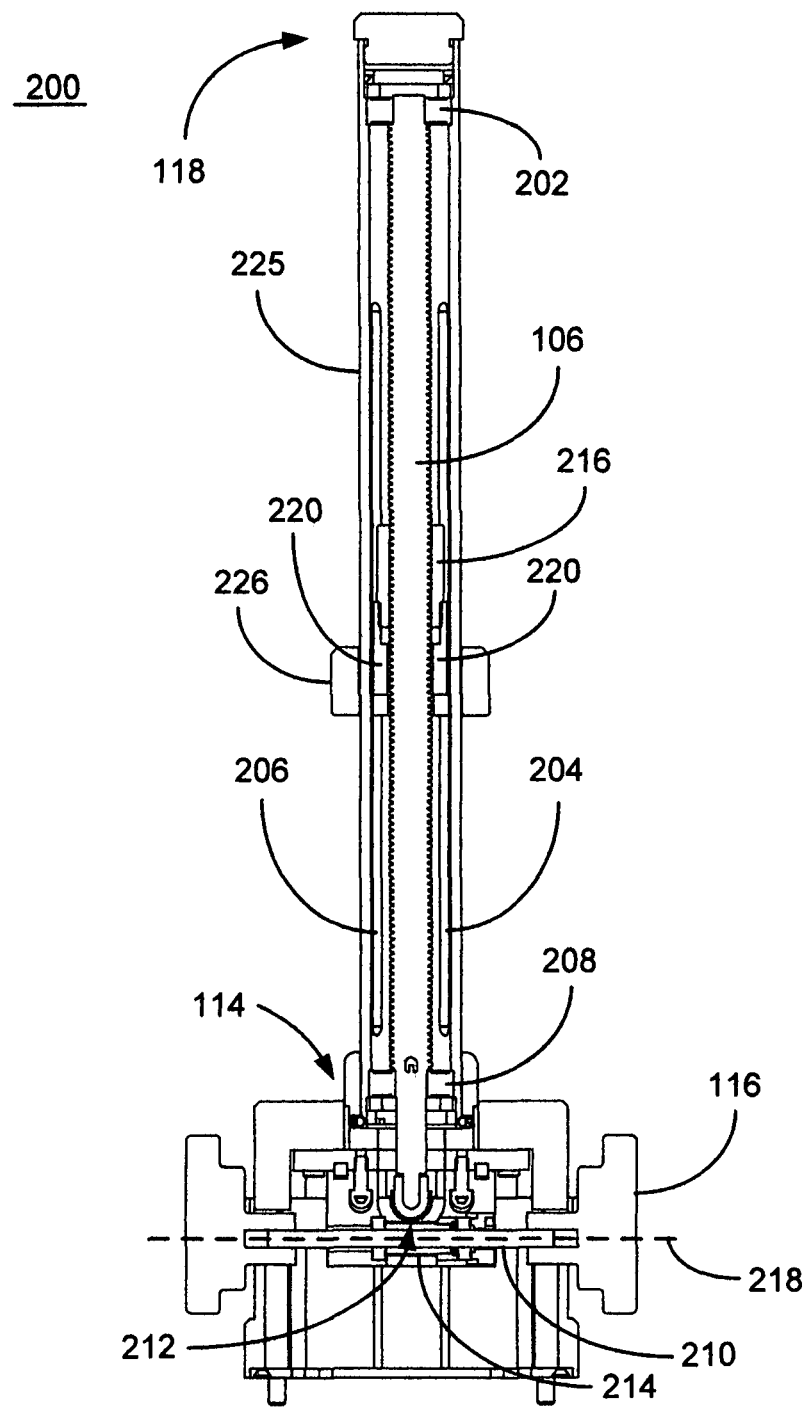
FIG. 2 shows a cross-sectional illustration of an embodiment of the linear translational stand arrangement similar to FIGS. 1A and 1B consistent with embodiments of the present invention.

FIG. 2 shows a cross-sectional illustration of an embodiment of the linear translational stand arrangement 200 similar to FIGS. 1A and 1B. One distinguishing difference with the translational stand arrangement 200 relative to FIGS. 1A and 1B is that in this embodiment, the hollow column 225 comprises two elongated openings 204 and 206. As revealed in this cross-sectional embodiment, the translational element 106 is a lead-screw that is rotatably supported and by a lower bearing 208 located at substantially the first end 114 and an upper bearing 202 located in the hollow column 225 at substantially the second end 118. As revealed by the cross-section, the lead-screw 106 is substantially axially centered in the hollow column 225. The lead-screw 106 is driven manually by a worm gear 212 which is motivated by the rotatable knob 116. More specifically, the worm 214, supported by a shaft 210, is rotated manually about a first axis 218 by the rotatable knob 116, which, in turn, provides translational rotation to the lead-screw 106 when coupled with the worm gear 212. The worm gear 212 and worm 214 can be designed with a pitch and slope sufficient to substantially prevent back drive. Back drive is a consequence of a high enough load on the collar 226 sufficient to turn the lead-screw 106. Though the worm gear system 212 and 214 is illustratively shown herein, other embodiments of mechanisms that can rotate the lead-screw 106 can include a miter gear, beveled gear, spur gear, belt drive, direct drive or some other functional equivalent, just to name several examples. In some embodiments of the present invention, a mechanism or mechanisms that rotate the lead-screw 106, such as the worm gear 212 and worm 214, can be manually driven by both a coarse and fine gear assembly, such as a planetary gear system (not shown) inside a knob, such as the knob 116. The support element 226, which is a collar as shown in this embodiment, is coupled with a lead-screw nut 216 via a pair of connecting members 220 that extend through the pair of elongated openings 204 and 206. The connecting members 220 and elongated openings 204 and 206 constrain the collar 226 from turning, thus, when the lead-screw 106 is rotated, the nut 216 is driven either towards either the first end 114 or the second end 118 of the column 225, depending on whether the lead-screw 106 is rotated clock-wise or counter clock-wise.

Figure 3A:
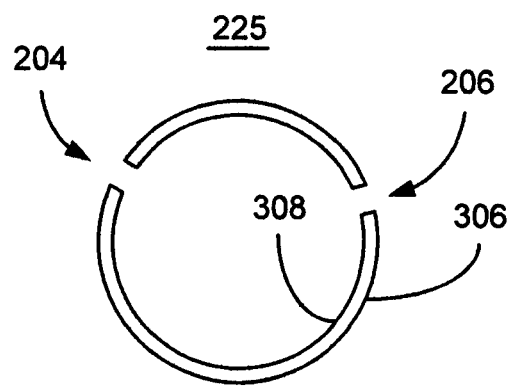
FIGS. 3A-3C show cross-sectional illustrations of different hollow column shape embodiments wherein the cross-sections consistent with embodiments of the present invention.
Figure 3B:
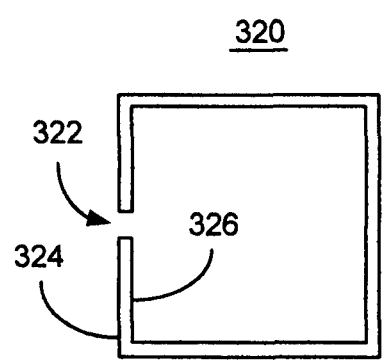
Figure 3C:
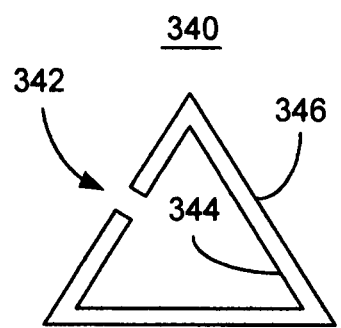

FIGS. 3A-3C show cross-sectional illustrations of different hollow column shape embodiments wherein the cross-sections are between the first end 114 and the second end 118 through the elongated opening(s). With respect to FIG. 3A, the cross-section of the hollow column 225 is sliced orthogonally along the length of the hollow column 225 of FIG. 2. As shown, the cross-section of the hollow column 225 is substantially circular with an inner surface 308 and an outer surface 306. The circular column 225 also shows the two elongated openings 204 and 304. The hollow column 320 of FIG. 3B illustrates a cross-section of a hollow rectangular column 320 having an inner surface 326 and an outer surface 324 and a single elongated opening 322. The hollow column 340 of FIG. 3C illustrates a cross-section of a hollow triangular column 340 having an inner surface 344 and an outer surface 346 and a single elongated opening 342. It will be clear from the illustrative examples shown herein that the cross-sectional shape of a hollow column is not limited to circle, rectangle or triangle. Further, the interior shape can be different from the exterior shape, for example, a hexagonal outer surface and a circular inner surface. A support element, such as the support element 110 of FIG. 1A, can be in contact with the outer surface of the hollow column via bearings or simply be spaced with at least enough clearance, to move along the column without obstruction.

Figure 4A:
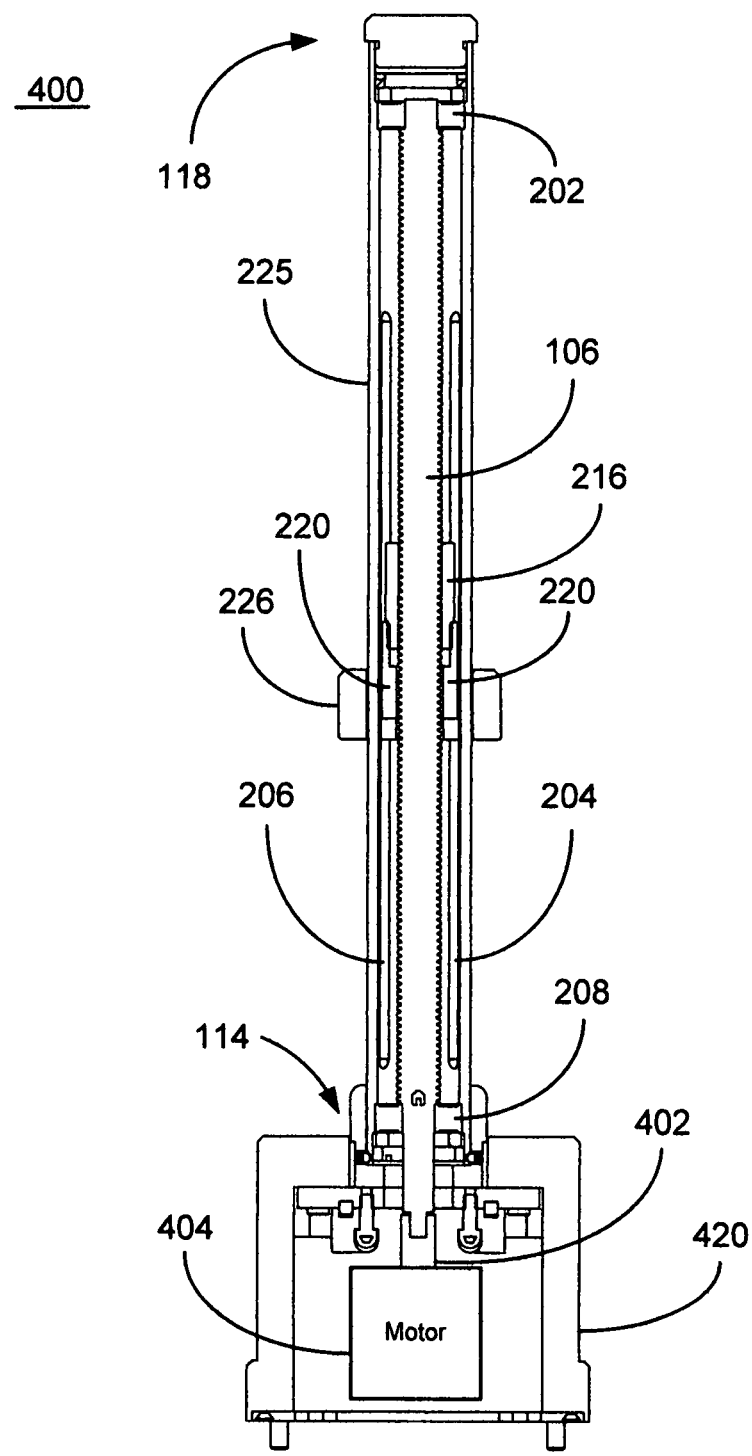
FIG. 4A is a cross-sectional illustration revealing the inside of a linear translational stand arrangement consistent with embodiments of the present invention.
Figure 4B:
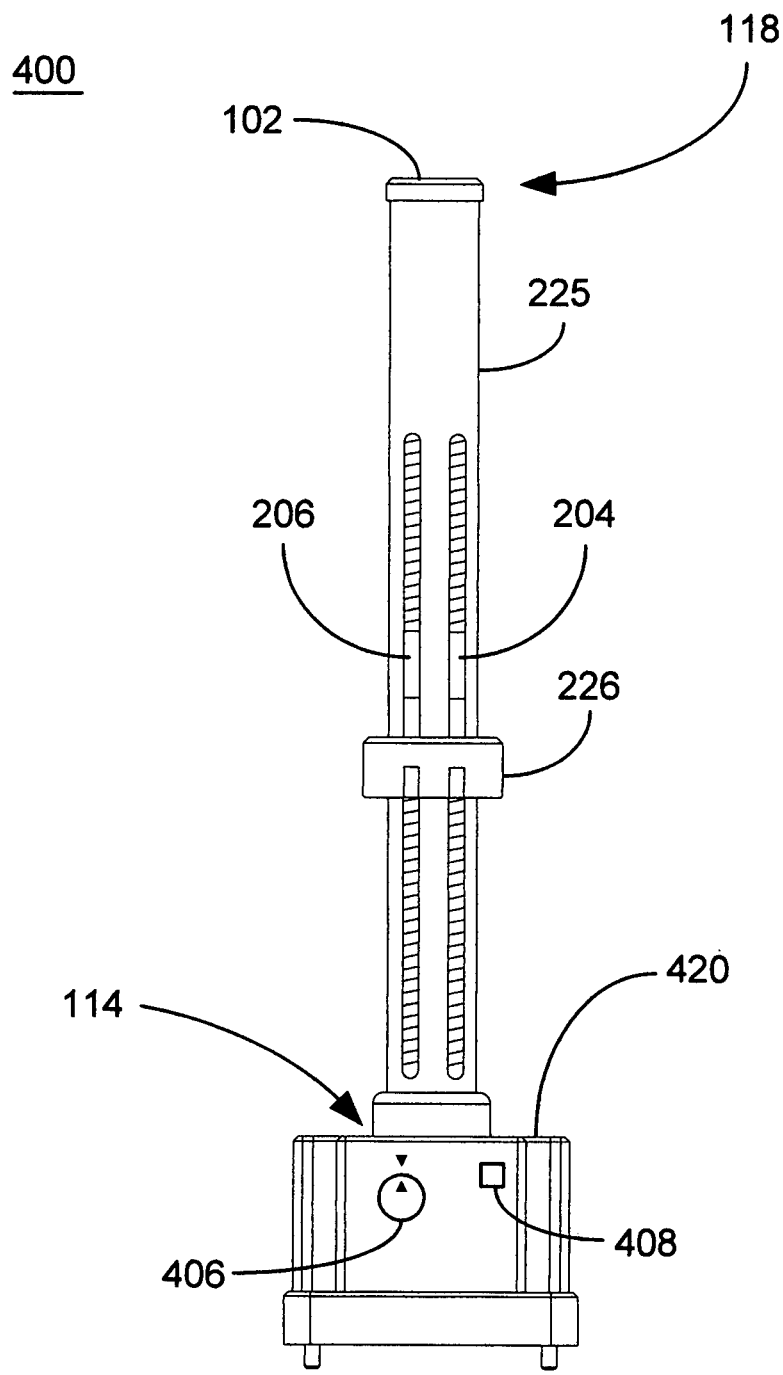
FIG. 4B is a standard (non cross-sectional) front view illustration of the motor driven linear translational stand arrangement consistent with embodiments of the present invention.

FIGS. 4A and 4B show a motor driven translational element embodiment of the present invention. FIG. 4A is a cross-sectional illustration revealing the inside of a linear translational stand arrangement 400 that is similar to the arrangement 200 of FIG. 2 with the exception that the arrangement 400 provides a motorized means for activating the translational element 106. As revealed, a motor 404, associated with an accommodating translational stand base 420 (or in this case disposed in the base 420), replaces the worm gear system 212 and 214 of FIG. 2. The motor 404 is coupled with the lead-screw 106 via a coupling element 402. The motor 404 is capable of rotating the lead-screw 106 both clock-wise and counter clockwise in order to drive the support element 226 between the first end 114 and second end 118. Hence, the faster the motor 404 rotates the lead-screw 106, the faster the support element 226 moves along the hollow column 225. The motor can be an AC motor, DC motor, stepper motor, servo motor or equivalent thereof without departing from the spirit and scope of the present invention.

FIG. 4B is a standard (non cross-sectional) front view illustration of the motor driven linear translational stand arrangement 400. As illustratively shown, the arrangement 400 comprises a motor control knob 406 that is capable of moving the support element 226 either up or down (that is, between the first and second ends 114 and 118) along the hollow column 225. In another embodiment, the control knob 406 can further adjust for the speed at which the support element 226 is moved along the column 225. As shown herein, the motor 404 can be turned on or off via the power switch 408.

Figure 5:
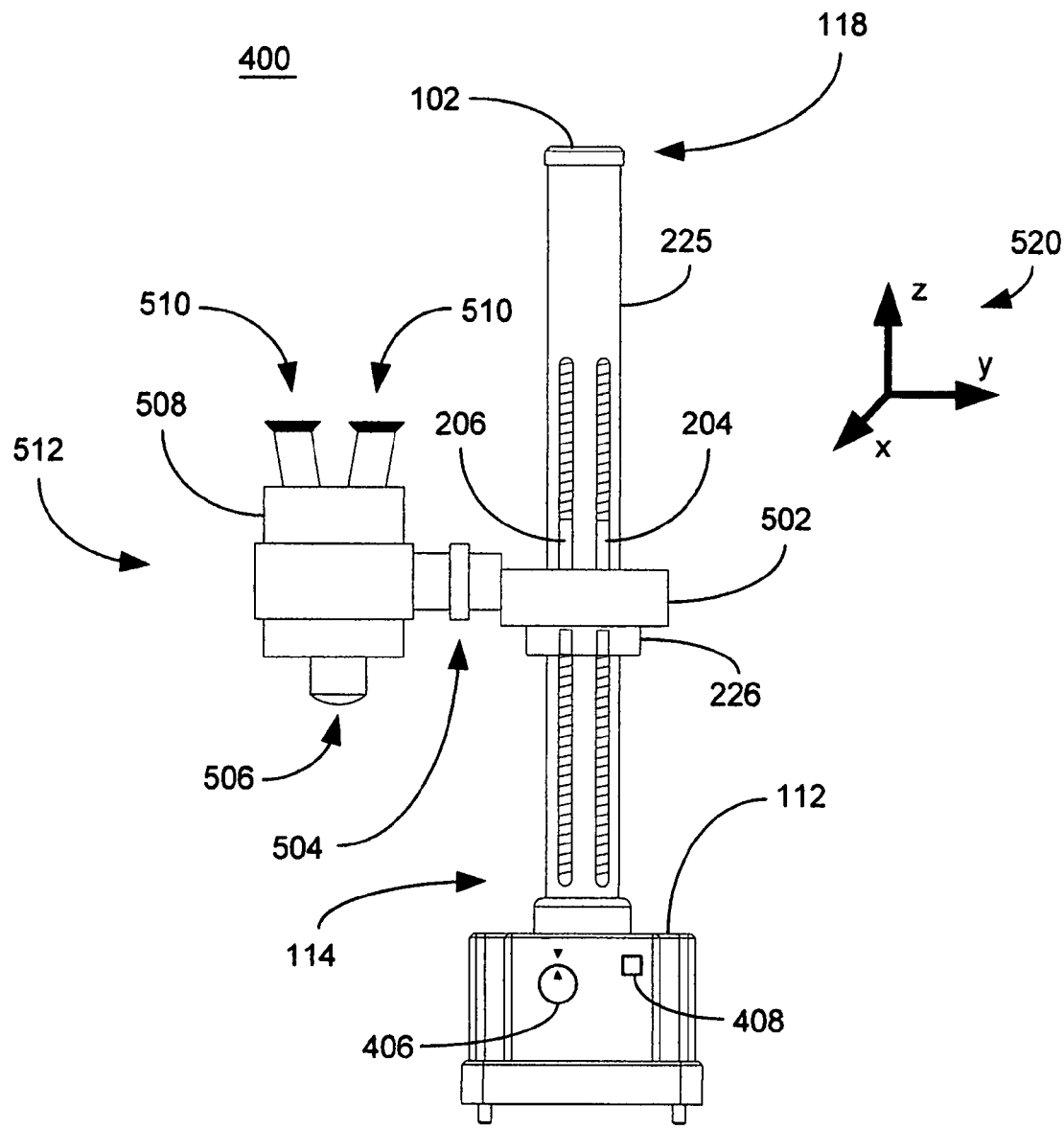
FIG. 5 is an illustration of the motor driven linear translational stand arrangement of FIG. 4B in combination with a microscope assembly consistent with embodiments of the present invention.

FIG. 5 is an illustration of the motor driven linear translational stand arrangement 400 of FIG. 4B in combination with a microscope assembly. As illustrated, the microscope system 512 is an inspection microscope with at least one lens 506, a microscope body 508 and a pair of eye pieces 510. The microscope system 512 is linked to the linear translational stand arrangement 400 via a boom stand assembly 504 in what is referred to as an "open architecture" because a boom stand assembly, such as the assembly 504, can accommodate a variety of microscope styles and manufacturers. The linear translational stand arrangement 400 moves the microscope in vertical direction, or "z" direction, towards and away from the first end 114 and second end 118, the boom stand assembly 504 facilitates adjustability towards/away and about the linear translational stand arrangement 400 in at least the "x" and "y" directions about the column 225. The "x", "y" and "z" directions are shown by the coordinate arrows 520. Notably, the "x" direction is actually directionally into and out from the page, however, for ease of understanding, the "x" is aimed slightly downward. The boom stand assembly 504 has a boom stand collar 502 that cooperates with the translational stand's collar 110 to stably support the boom stand assembly 504 and microscope assembly 512. In certain cases where the microscope assembly 512 is heavy or cumbersome, this embodiment provides a more optimal means for microscope adjustability. In an alternative embodiment wherein the microscope system 512 and boom stand system 504 is cooperating with a manual translational stand arrangement 200 of FIG. 2, the worm gear system 212 and 214 can be provided with an appropriate gear pitch to substantially prevent back drive of the microscope system 512, such as for microscope systems that are especially heavy.

Figure 6:
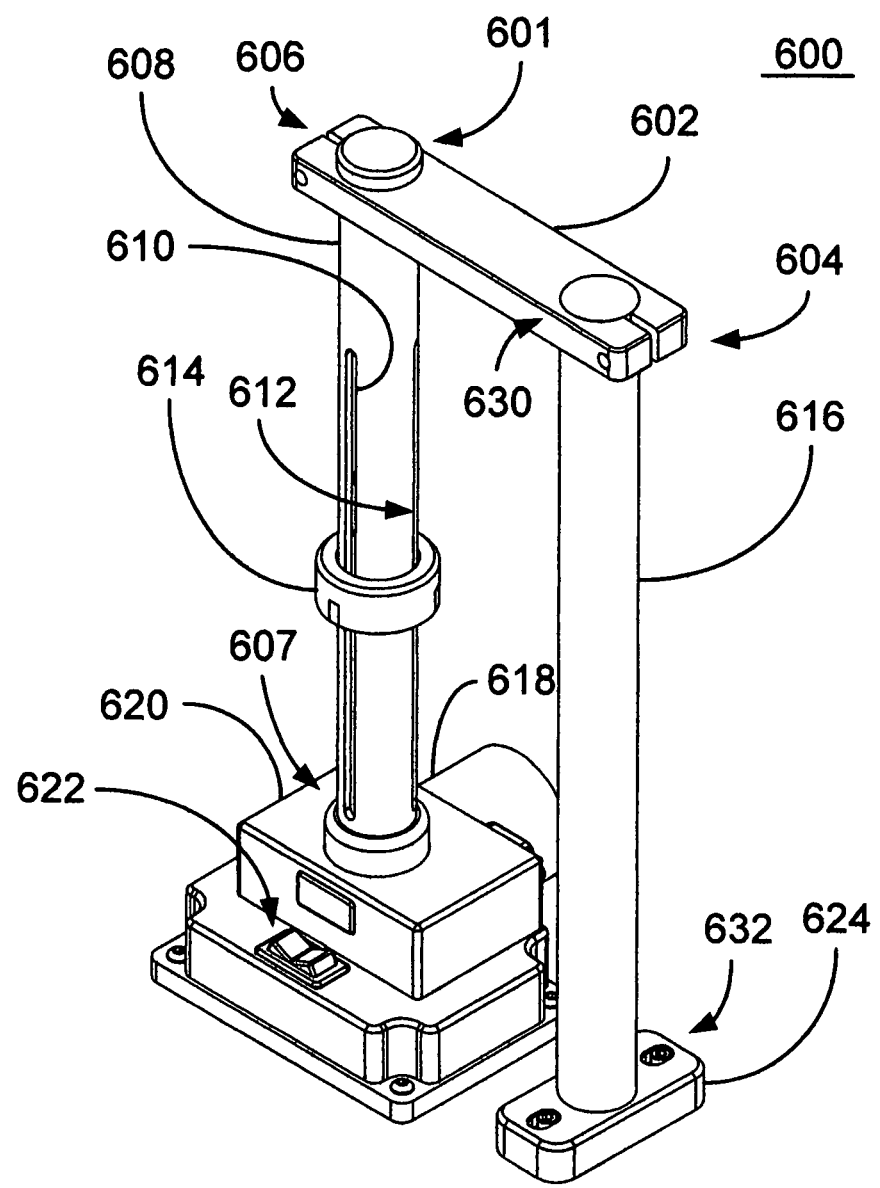
FIG. 6 is an illustration of a motor driven linear translational stand arrangement with a secondary outrigger assembly consistent with embodiments of the present invention.

FIG. 6 is an illustration of a motor driven linear translational stand arrangement with a secondary outrigger assembly. As illustrated, the motor driven linear translational stand arrangement 600 comprises a base 620 connected to a hollow column 608 that has a first elongated opening 610 and a second elongated opening 612 that extend between the first end 607 and second end 606. The column 608 is attached to the base 620 at the first end 607 and an outrigger connection member 602 at the second end 606. The linear translational stand arrangement 600 comprises a lead-screw translational element (not shown), which is inside of the hollow column 608. The lead-screw translational element moves the support collar 614 along the column 608 between the first end 607 and the second end 606. The lead-screw translational element has a cooperating relationship with the support collar 614 via the two elongated openings 610 and 612. The lead-screw translational element is driven by the motorized system 618 located at the base 620. The motorized system 618 is actuated up an down with the switching element 622. The linear translational stand arrangement 600 is further stabilized by the outrigger support 616 which is connected to the column 608 substantially at the top 630 of the outrigger support 616 via the outrigger connection member 602. Among certain advantageous attributes, the outrigger support 616 can provide additional vibration reduction. In this embodiment, the outrigger connection member 602 is clamped to the column 608 and the outrigger support 616 by way of clamping slots, such as the clamping slot 604. The clamping slots provide simple adjustability to align the outrigger support 616 and the linear translation stand 601. Though the clamping slot system 604 is used in this embodiment, other techniques to link the outrigger support 616 with the column 608 can be employed without deviating from the scope and spirit of the outrigger invention. The outrigger support 616 is supported by an outrigger base 624 at the bottom 632 of the outrigger support 616.

Figure 7:
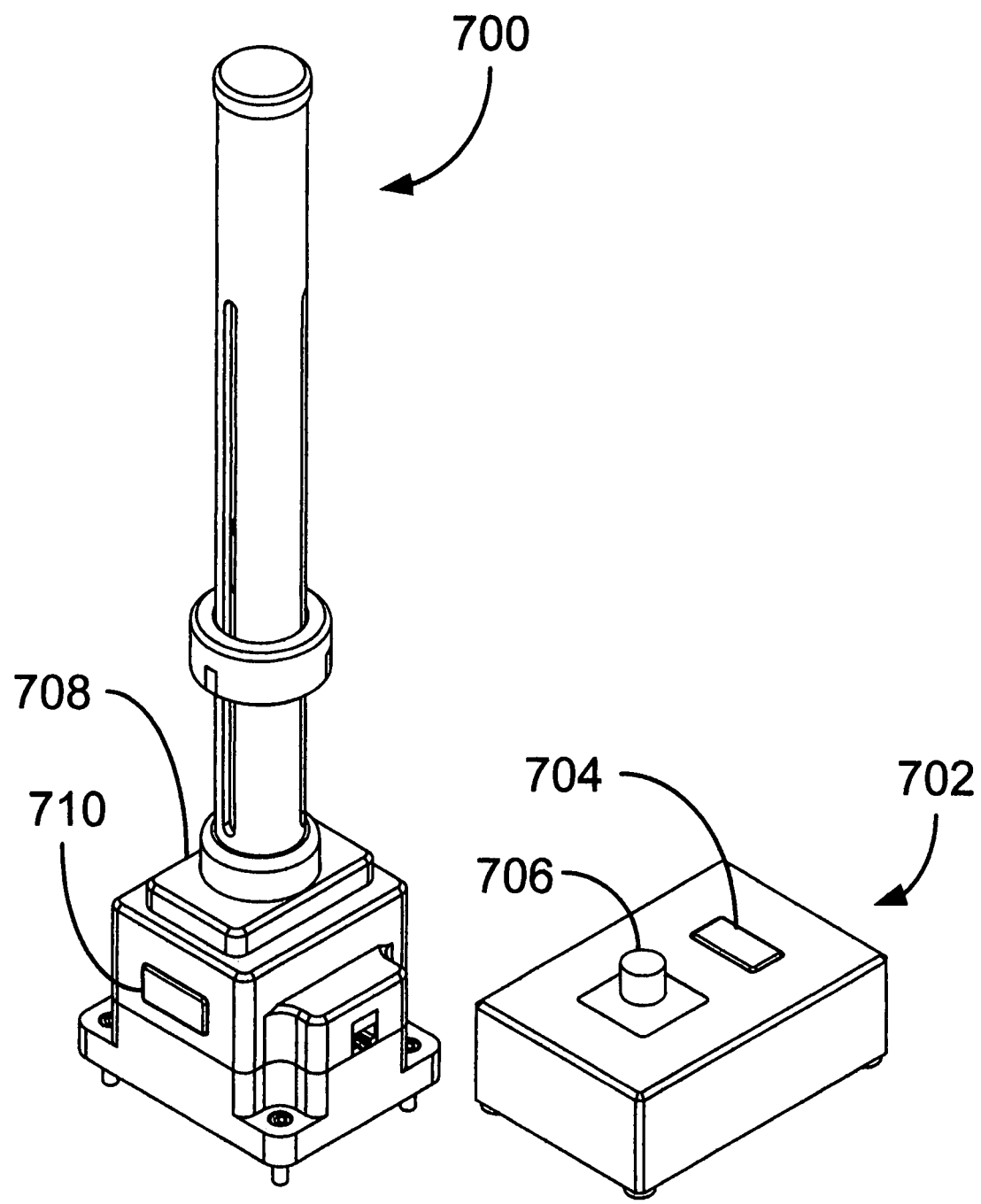
FIG. 7 is an illustration showing an external controlling configuration consistent with embodiments of the present invention.

FIG. 7 is an illustration showing an external controlling embodiment of the present invention. The servo motor driven linear translational stand arrangement 700 is provided with a servo motor (not shown) substantially disposed in a base 708 associated with the linear translational stand arrangement 700. An on/off switch 710 located at the base 708 facilitates enabling the servo motor. The motor can be powered and controlled via power and controller cables (not shown) linked with the servo control box 702. Alternatively, the linear translational stand arrangement 700 can be powered independently and receive controller input from the servo control box 702 via a wireless connection. The servo control box 702 can be supplied with power from a standard AC wall socket, battery system or other alternative means of power. The servo control box 702 provides at least an on/off switch 704 and a direction and speed control device 706.

Figure 8:
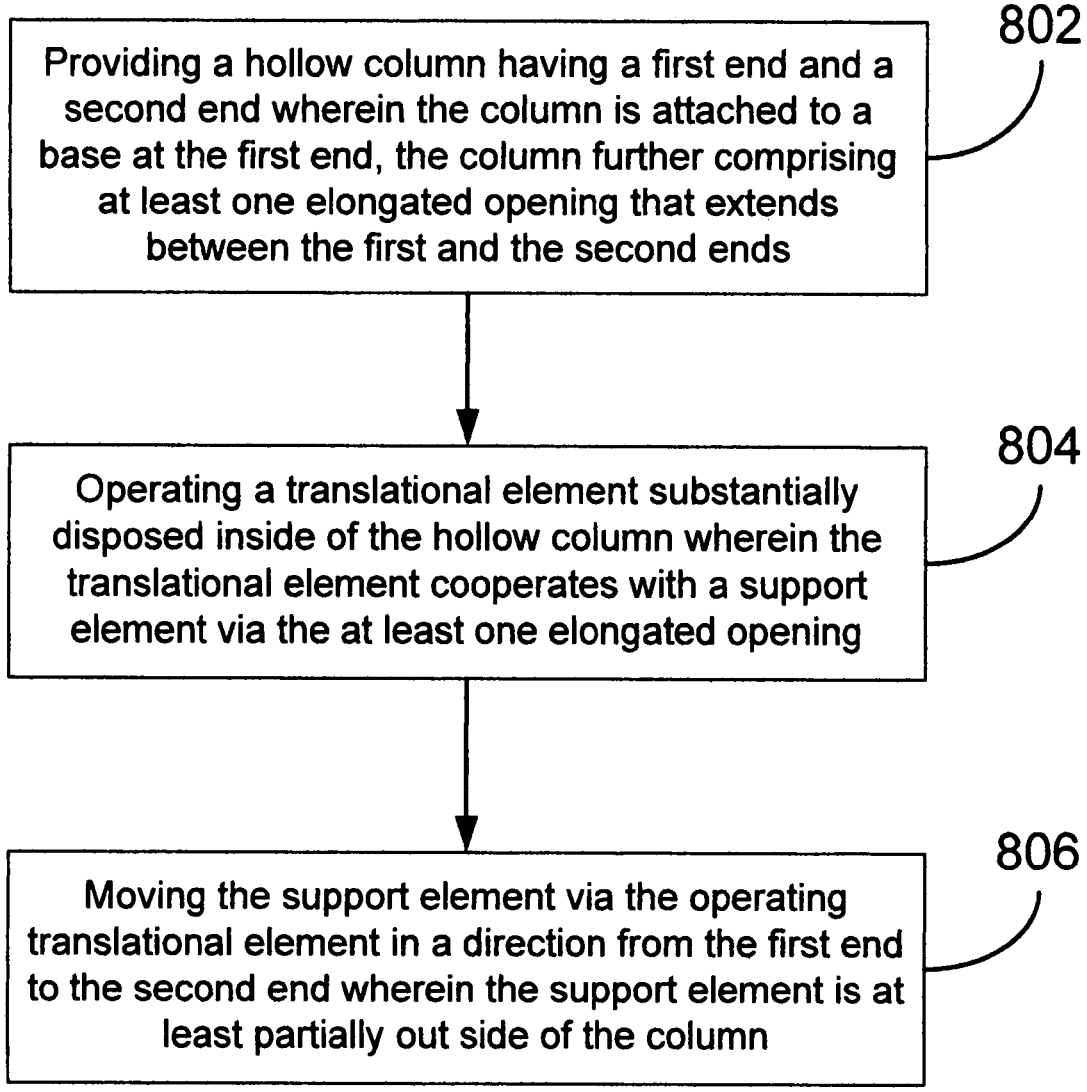
FIG. 8 is a flow chart of a method of operation of a linear translational stand that is consistent with certain embodiments of the present invention.

Referring now to FIG. 8, shown therein is a method to practice operating a linear translational stand consistent with embodiments of the present invention. It should be recognized that the steps presented in the described embodiments of the present invention do not require any particular sequence unless otherwise stated. Also, similar elements are used from FIGS. 1A-1B for purposes of illustration in this embodiment but are not intended to limit the methods presented herein the elements of FIGS. 1A and 1B. As indicated in block 802, providing the linear translational stand 100 with a hollow column 104 having a first end 114 and a second end 118 wherein the column 104 is attached to a base 112 at the first end 114, the column 104 further comprising at least one elongated opening 108 that extends between the first and the second ends, 114 and 118 respectively. Method step 804 shows the step of operating a translational element 108 substantially disposed inside of the hollow column 104 wherein the translational element 108 cooperates with a support element 110 via the at least one elongated opening 108. In one embodiment of the method, the translational element 106 can be a lead-screw that cooperates with a lead-screw nut, such as the lead-screw nut 216 of FIG. 4A, by operating in a rotational manner; the lead-screw nut is attached to the support element 110 via at least one member, such as the connecting member 220 of FIG. 4A, that extends through the at least one elongated opening 108. Further, the operating step 804 can be accomplished by rotating the lead-screw 108 with a rotating device, such as a motor 404 of FIG. 4A, disposed substantially in the base, such as the base 420 of FIG. 4A. Method step 806 shows the step of moving the support element 110 via the operating translational element 108 in a direction from the first end 114 to the second end 118 wherein the support element 110 is at least partially out side of the column 104. In one embodiment, the support element 110 can be a collar that substantially conforms to an exterior shape of the column 104 with at least enough clearance, or space, to move without obstruction in the moving step 806.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, additional translational elements can be used consistent with embodiments of the present invention while still maintaining substantially the same functionality without departing from the scope and spirit of the present invention. Another example can include various additional outrigger apparatuses or alternative motor systems without departing from the scope and spirit of the present invention. Although the preferred embodiments described herein are directed to a linear translational microscope stand, such as the stand 400 shown with the microscope 512, of FIG. 5, it will be appreciated by those skilled in the art that the teachings of the present invention can be applied to other systems requiring such a translational stand, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A method of operating a linear translational stand adapted to perform a method comprising:

providing a hollow circular column having a first end and a second end wherein said hollow circular column is attached to a base at said first end, said hollow circular column further comprising at least one elongated opening that extends between said first and said second ends, said elongated opening at least partially viewable externally;

operating a translational element substantially confined inside of said hollow circular column wherein said translational element cooperates with a support element via a member that extends into said hollow circular column through said at least one elongated opening, said support element possesses a support element collar that essentially conforms to the exterior circumference of said hollow circular column with at least enough clearance to move along said hollow circular column without obstruction, said collar adapted to support a microscope assembly; and moving said support element via said translational element between said first end to said second end, wherein said microscope assembly possesses a boom stand collar that essentially rests on top of said support element collar to form a cooperating relationship.

\* \* \* \* \*